Sept. 8, 1925.
R. L. FRASER
ANGLE GAUGE FOR X-RAY MACHINES
Filed Sept. 5, 1924
1,553,229
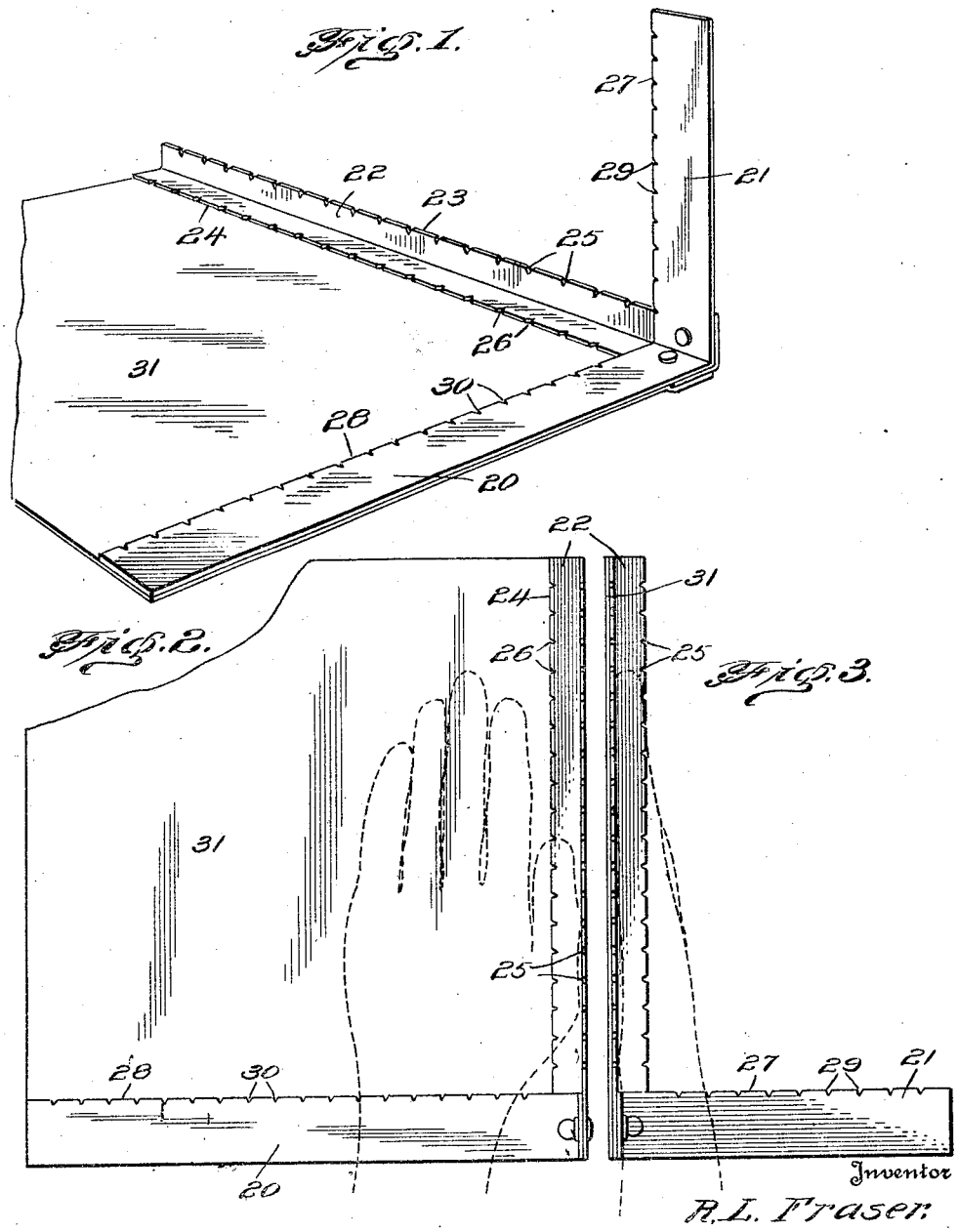
Inventor
R. L. Fraser.
By Townshend & Townshend
Attorney Patented Sept. 8, 1925.

1,553,229

UNITED STATES PATENT OFFICE.

ROBERT L. FRASER, OF McCRORY, ARKANSAS.

ANGLE GAUGE FOR X-RAY MACHINES.

Application filed September 5, 1924. Serial No. 736,063.

*To all whom it may concern:*

Be it known that I, ROBERT L. FRASER, a citizen of the United States, residing at McCrory, in the county of Woodruff and State of Arkansas, have invented certain new and useful Improvements in Angle Gauges for X-Ray Machines, of which the following is a specification.

My invention relates to apparatus employed in connection with X-ray photography, and has particular reference to instrumentalities for definitely locating foreign objects embedded in the human body.

The primary object is the provision of means for locating foreign objects in a body by mathematical precision, making use of known angles and factors. Other objects are to provide a guide member adapted for use in connection with a portion of a body to be X-rayed, arranged for registering on the film: to provide a scaled and definitely angled guide for such use for locating an embedded object by mathematical computation.

With these objects in view, and such others as will be apparent from the description, the invention resides in the novel construction, combination and arrangement of parts hereinafter described and claimed, and illustrated in the accompanying drawings, of which:—

Figure 1 is a perspective of a device constructed in accordance with the principles of the invention, Figure 2 is a plan view thereof as applied, and Figure 3 is an elevation at a right angle to Figure 2.

In detail the invention comprises an elongated rectangular metal strip or bar 20 having flat faces and bent upon itself at a right angle to provide a relatively short arm 21.

Riveted over the bend of the arms 20 and 21 is a channel metal strip or bar 22 which extends at a right angle relative to the arms 20 and 21 and which has its side edges 23 and 24 provided with a graduated series of notches 25 and 26, the graduations being arranged at intervals of fractional portions of an inch.

The inner edges 27 and 28 respectively of the bars or arms 21 and 20 are provided with similarly arranged and graduated notches 29 and 30, and the device may be utilized with a cardboard plate 31 secured to the outer faces of the arms 20 and 22, it being of a rectangular shape. The use of this plate 31 is not a necessary part of the invention and generally in practice it is dispensed with, its function being the formation of a base upon which the object treated may be rested, for accuracy of alignment.

In operation the guide is attached to that portion of a body to be photographed, which is a human hand in the present illustration, with arm 20 and member 22 engaged therewith. The photograph is then made, and by reason of the metallic composition of the guide, it and its graduated notches will show clearly on the film. A second photograph is then made at a right angle, the two photographs being made from the angles illustrated in Figures 2 and 3. As the foreign object to be located will show in the respective films, the scales provided by the notches in the edges of the arms will indicate the exact point at which the object is lodged in the hand.

By projecting lines over the hand from the guide in accordance with the scale readings of the films, and computing the thickness of the hand, a probing needle may be directed at once to the exact spot where the object is located.

The device is further useful in locating objects where the manipulation can not be so simple, as in thicker portions of the human body. In such cases an angle computation is made, taking into consideration the known angles and distances of the arms and scales, and also the distance of the light above and relative to the base on which the guide is disposed.

The present invention is not concerned with the exact manner in which the calculations are made, but rather with the device by which such calculations as desired are made possible. I desire it to be understood that I do not intend the invention to be limited to the details and materials as shown and described, but that any desired changes and modifications may be made in the details thereof as will fall within the scope of the invention as claimed.

I claim:—

1. An angle gauge for X-ray machines comprising a pair of connected flat strips bent transversely and longitudinally respectively at the same angle, and each strip having a graduated scale thereon.

2. An angle gauge for X-ray machines comprising a pair of flat crossed strips bent transversely and longitudinally respectively at the same angle, means for connecting said strips at the angled portions thereof, and each strip having a graduated scale thereon.

3. An angle gauge for X-ray machines comprising a pair of flat strips bent transversely and longitudinally respectively at a right angle, means for connecting the angled portions of said strips at one end of the longitudinally bent strip, and each strip having a graduated scale thereon.

4. An angle gauge for X-ray machines comprising a straight edged metal strip bent intermediate its ends at a right angle, a channeled metal strip perpendicular thereto and secured over the bend thereof in rigid relation, scaled indentations being provided in the side edges of each of said strips, and an opaque, stiff backing member secured over said perpendicular strip and an adjacent portion of the first named strip.

5. An angle gauge for X-ray machines comprising a flat straight edged metal strip bent intermediate its ends at a right angle to dispose the flat faces of the portions thereof in perpendicular relation, a channeled metal strip secured over the bend and perpendicular to an edge thereof with its flanges in the planes of the bent strip portions, the edges of said strips being notched at graduated and scaled intervals.

6. An angle gauge for X-ray machines comprising a pair of bent connected strips having graduated scales thereon forming a pair of equal scaled angles disposed in different planes, said angles having a common side, whereby rocking of the gauge on the common angle side permits accurate locating of an object relative to said planes.

In testimony whereof I affix my signature.

ROBERT L. FRASER.